(No Model.)
W. P. TARBELL.
CABINET CLAMP.
No. 410,815. Patented Sept. 10, 1889.
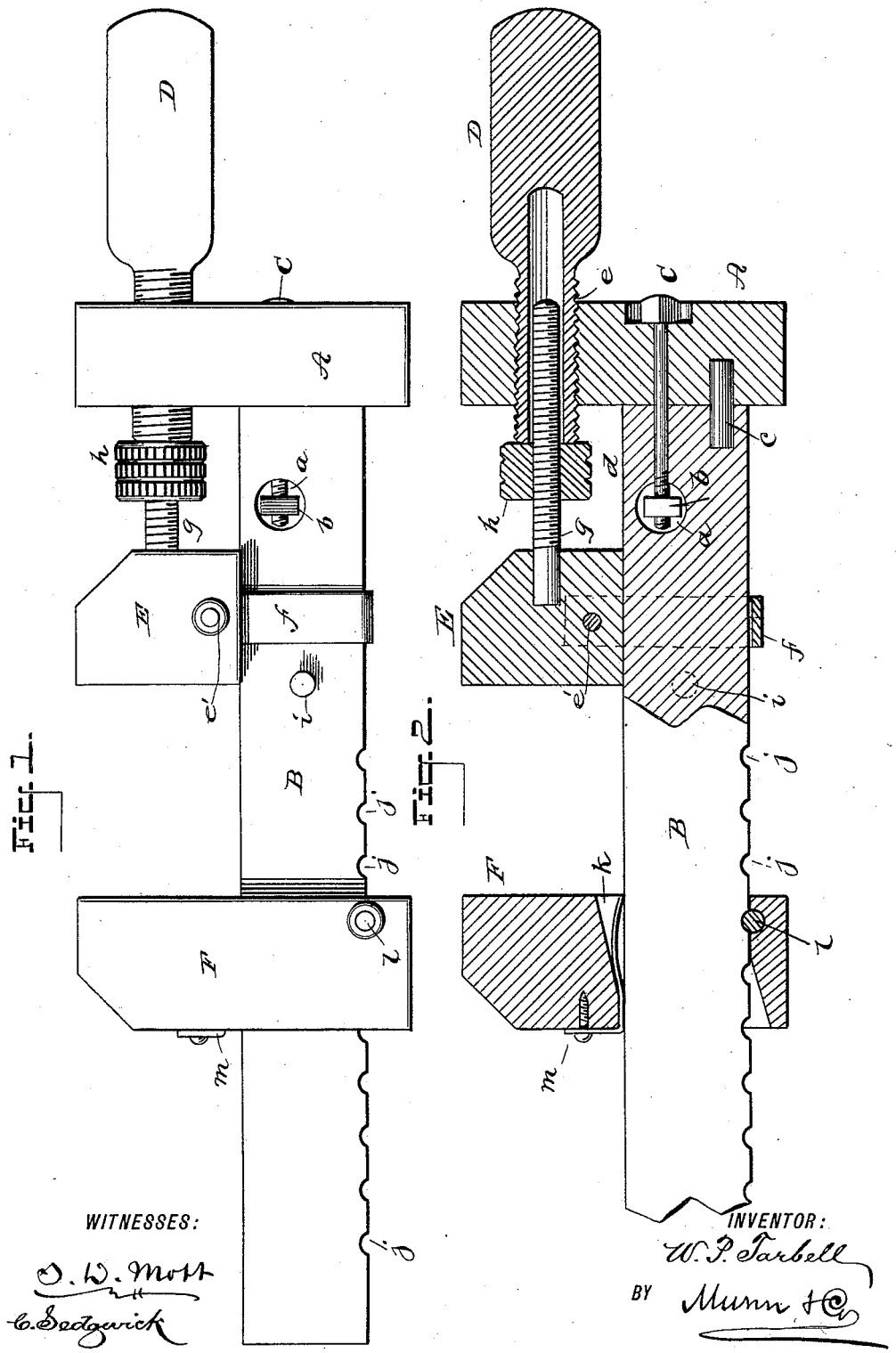
WITNESSES:
O. W. Mott
C. Sedgwick
INVENTOR:
W. P. Tarbell
BY Munn & Co.
ATTORNEYS.

UNITED STATES PATENT OFFICE.

WENDELL P. TARBELL, OF MILFORD, NEW HAMPSHIRE.

CABINET-CLAMP.

SPECIFICATION forming part of Letters Patent No. 410,815, dated September 10, 1889.

Application filed September 19, 1888. Serial No. 285,781. (No model.)

*To all whom it may concern:*

Be it known that I, WENDELL P. TARBELL, of Milford, in the county of Hillsborough and State of New Hampshire, have invented a new and Improved Cabinet-Clamp, of which the following is a specification, reference being had to the annexed drawings, forming a part thereof, in which—

Figure 1 is a side elevation of my improved cabinet-clamp, and Fig. 2 is a longitudinal section.

Similar letters of reference indicate corresponding parts in both views.

The object of my invention is to provide a clamp for the use of cabinet-makers and others, by which pressure may be applied to the edge of the work without the necessity of placing the clamping-screw exactly opposite the center of resistance.

The invention consists in details of construction hereinafter described and claimed.

The head-piece A is attached to the bar B by means of a joint-bolt C, which passes through the head-piece and into a longitudinal hole bored in the bar B. In a transverse hole $a$ in the bar B is placed the nut $b$, which is received on the bolt C. The head-piece A projects beyond one edge of the bar B, and is kept from turning by a dowel $c$ inserted in the head-piece and in the end of the bar B. To give the head-piece a suitable leverage, the bolt C is placed near the front edge $d$ of the bar B.

In the head-piece A, at a suitable distance from the bar B, is formed a threaded hole $e$, which is parallel with the said bar B, and to which is fitted an axially-bored hand-screw D. A jaw E is held in contact with the front edge of the bar B by the metallic strips $f$, attached to the jaw and passing around the bar B.

In the jaw E, opposite the end of the tubular screw D, is inserted a screw-threaded rod $g$, which enters the bore of the screw D, and upon the screw-rod $g$ is placed a milled nut $h$ between the end of the screw D and the jaw E. The thread of the rod $g$ is made finer than that of the screw D, so that the said screw D and rod $g$, in conjunction with the nuts in which they turn, may act as a differential screw, as will presently be described.

In the side of the bar B, and projecting laterally therefrom, is inserted a screw $i$, which acts as a stop, limiting the motion of the jaw E, thus preventing the screw-rod $g$ from becoming disengaged from the screw D.

In the back of the bar B are formed notches $j$, preferably of semicircular shape, and to the body of the bar is fitted the jaw F, having an oblique mortise $k$ for receiving the said bar B. The mortise $k$ is enlarged at diagonally-opposite ends by removing the material forming acute angles respectively between the upper and lower oblique sides of the mortise and the upper and lower surfaces of the bar B. In the said jaw F is inserted a rivet $l$, which passes through the mortise and is adapted to engage the semicircular notches $j$ of the bar B.

To the edge of the jaw F, at the front of the bar B, is secured a right-angled spring $m$, which extends into the mortise $k$ and bears against the face of the bar B.

By tipping the jaw F toward the head A the rivet $l$ is disengaged from the notch in the back of the bar B, when the jaw may be moved to any desired point on the bar, and upon releasing the jaw the spring $m$ causes it to regain its normal position at right angles with the bar B, and with the rivet $l$ in engagement with one of the notches $j$, and with the jaw bearing against the rear edge of the bar B.

The work to be clamped is placed between the jaws E F, and the jaw E is moved forward into contact with the work by turning the nut $h$, the said nut being in contact with and bearing against the end of the screw D. Pressure is brought to bear upon the work by turning the screw D and nut $h$ simultaneously, the nut $h$ being carried by frictional contact with the end of the screw D. The coarse and fine threads of the two screws act together as a differential screw after the well-known manner, and enable the operator to bring a heavy pressure to bear upon the work in the clamp.

The metal strap $f$ serves to hold the jaw E from being tipped up or forced away from the bar B, and the rivet $e$, which holds the strap to the said jaw E, also strengthens the jaw, preventing it from splitting, and with the screw $g$ inserted in the jaw the clamping of any object, even if off the center of the screw, can be accomplished without cramping or the bending of the screw $g$, both ends of the screw being well supported.

Having thus described my invention, I claim as new and desire to secure by Letters Patent—

1. In a cabinet-clamp, the combination of the head A, the clamping-bar B, the joint-bolt C, passing through the head and into the clamp-bar, and the dowel $c$, inserted in the head and extending into the end of the clamp-bar, substantially as specified.

2. In a cabinet-clamp, the combination of the clamp-bar B, provided with the head A, the axially-bored screw D, inserted in the said head, the sliding jaw E, the threaded rod $g$, and the nut $h$, substantially as specified.

WENDELL P. TARBELL.

Witnesses:
J. M. TARBELL,
J. M. BARTLETT.